(12) United States Patent
Hayhow et al.

(10) Patent No.: US 7,584,395 B2
(45) Date of Patent: Sep. 1, 2009

(54) SYSTEMS, METHODS AND APPARATUS FOR SYNTHESIZING STATE EVENTS FOR A TEST DATA STREAM

(75) Inventors: Reid F. Hayhow, La Porte, CO (US); Robert S. Kolman, Longmont, CO (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 475 days.

(21) Appl. No.: 11/399,730

(22) Filed: Apr. 7, 2006

(65) Prior Publication Data

US 2007/0255989 A1 Nov. 1, 2007

(51) Int. Cl.
G06F 11/263 (2006.01)
G06F 11/22 (2006.01)

(52) U.S. Cl. .................................. 714/742; 714/738
(58) Field of Classification Search ........................ None
See application file for complete search history.

(56) References Cited

U.S. PATENT DOCUMENTS 7,171,602 B2 * 1/2007 Gomes et al. ............... 714/744
2004/0117802 A1 * 6/2004 Green ........................ 719/318
2006/0050684 A1 * 3/2006 Bangham et al. ............ 370/352

* cited by examiner

*Primary Examiner*—Cynthia Britt
*Assistant Examiner*—Dipakkumar Gandhi
(74) *Attorney, Agent, or Firm*—Holland & Hart, LLP

(57) ABSTRACT

In one embodiment, a method of has the steps of A) accessing a stream of test data comprising 1) a number of state events and 2) a number of data events interspersed with the ones of the state events; B) upon accessing one of the data events, determining if the data event is in conformity with the current test state; C) if not, 1) buffering a number of additional data events; and 2) if the number of additional data events imply that a state event should have been received and a state change should have occurred, prior to accessing the data event, i) synthesizing and publishing the state event that should have been received, in conformity with the implied state change; ii) updating the current test state; and iii) then, publishing the data event.

22 Claims, 3 Drawing Sheets

SYSTEMS, METHODS AND APPARATUS FOR SYNTHESIZING STATE EVENTS FOR A TEST DATA STREAM

BACKGROUND

Test data, such as that produced by a tester performing tests on a number of devices under test (DUTs), reports individual data events and state events that put the data events into the proper context. Modern testers and data processing equipment have proven highly reliable, however, issues still occur that cause the test data to contain errors.

SUMMARY OF THE INVENTION

In one embodiment, a method comprises: A) accessing a stream of test data, the test data comprising 1) a number of state events that update a current test state and 2) a number of data events interspersed with the ones of the state events; B) upon accessing one of the data events, determining if the data event is in conformity with the current test state; C) if the data event is in conformity with the current test state, publishing the data event; and D) if the data event is not in conformity with the current test state, 1) buffering a number of additional data events; and 2) if the number of additional data events imply that a state event should have been received and a state change should have occurred, prior to accessing the data event, i) synthesizing and publishing the state event that should have been received, in conformity with the implied state change; ii) updating the current test state in accord with the implied state change; and iii) then, publishing the data event.

In another embodiment, a system for synthesizing state events for a test data stream, comprises A) an interface, operable to access a stream of test data, the test data comprising 1) a number of state events that update a current test state and 2) a number of data events interspersed with the ones of the state events; B) data storage; and C) a processor, in communication with the interface and data storage, operable to, 1) upon accessing one of the data events, determine if the data event is in conformity with the current test state; 2) determine if the data event is in conformity with the current test state, publish the data event; and 3) if the data event is not in conformity with the current test state, i) cause the data storage to buffer a number of additional data; and ii) if the number of additional data events imply that a state event should have been received and a state change should have occurred, prior to accessing the data event, a) synthesize and publish the state event that should have been received, in conformity with the implied state change; b) update the current test state in accord with the implied state change; and c) then, publish the data event.

In another embodiment, one or more machine-readable mediums having stored thereon sequences of instructions, which, when executed by a machine, cause the machine to perform the actions of: A) accessing a stream of test data, the test data comprising 1) a number of state events that update a current test state and 2) a number of data events interspersed with the ones of the state events; B) upon accessing one of the data events, determining if the data event is in conformity with the current test state; C) if the data event is in conformity with the current test state, publishing the data event; and D) if the data event is not in conformity with the current test state, 1) buffering a number of additional data events; and 2) if the number of additional data events imply that a state event should have been received and a state change should have occurred, prior to accessing the data event, i) synthesizing and publishing the state event that should have been received, in conformity with the implied state change; ii) updating the current test state in accord with the implied state change; and iii) then, publishing the data event.

Other embodiments are also disclosed.

BRIEF DESCRIPTION OF THE DRAWINGS

Illustrative embodiments of the invention are illustrated in the drawings, in which.

DETAILED DESCRIPTION OF THE INVENTION

Testers are highly reliable devices for performing tests on a number of devices under test (DUTs), however the complexities of testing environments may still cause test results, created by the tester, to have errors. One such error is a misplaced data event within a stream of test data. A tester produces a stream of test data which comprises state events, such as to give context to subsequent data events, and the data events themselves. The data events provide the test results themselves (e.g., "pin 14=3.2 v", "continuity=false") and may be single data elements or complex data structures. If a state event provides a given context but a subsequent test data does not belong within that context, then an error results. Another potential error occurs when a state event should be received, and thereby trigger an update to the current test state, but the state event is absent from the test data.

Without conditioning the test data, a data event that was received out of place by a consumer (e.g., formatter, analyzer, reporter) of the test data, such as when 1) the data event was received associated with a state event that is not a correct state event, or 2) the data event was received without any associated state events, then the test data that followed may be deemed corrupt and unusable. The amount of unusable test data may be all the test data that follows until the tester is restarted and could represent hours or even days of testing.

By analyzing the data events, the test data may be conditioned to repair many errant data events allowing an increased test data utilization. If a large portion of the test data is missing then data events may still be discarded but the more likely scenario is a small "glitch" in inserting state events into the proper position in the test date. Those data events that are associated with an incorrect state event can have an appropriate state event synthesized and inserted into the test data in the proper place. As a result the consumers of the test data see the test data as it was intended.

Figure 1:
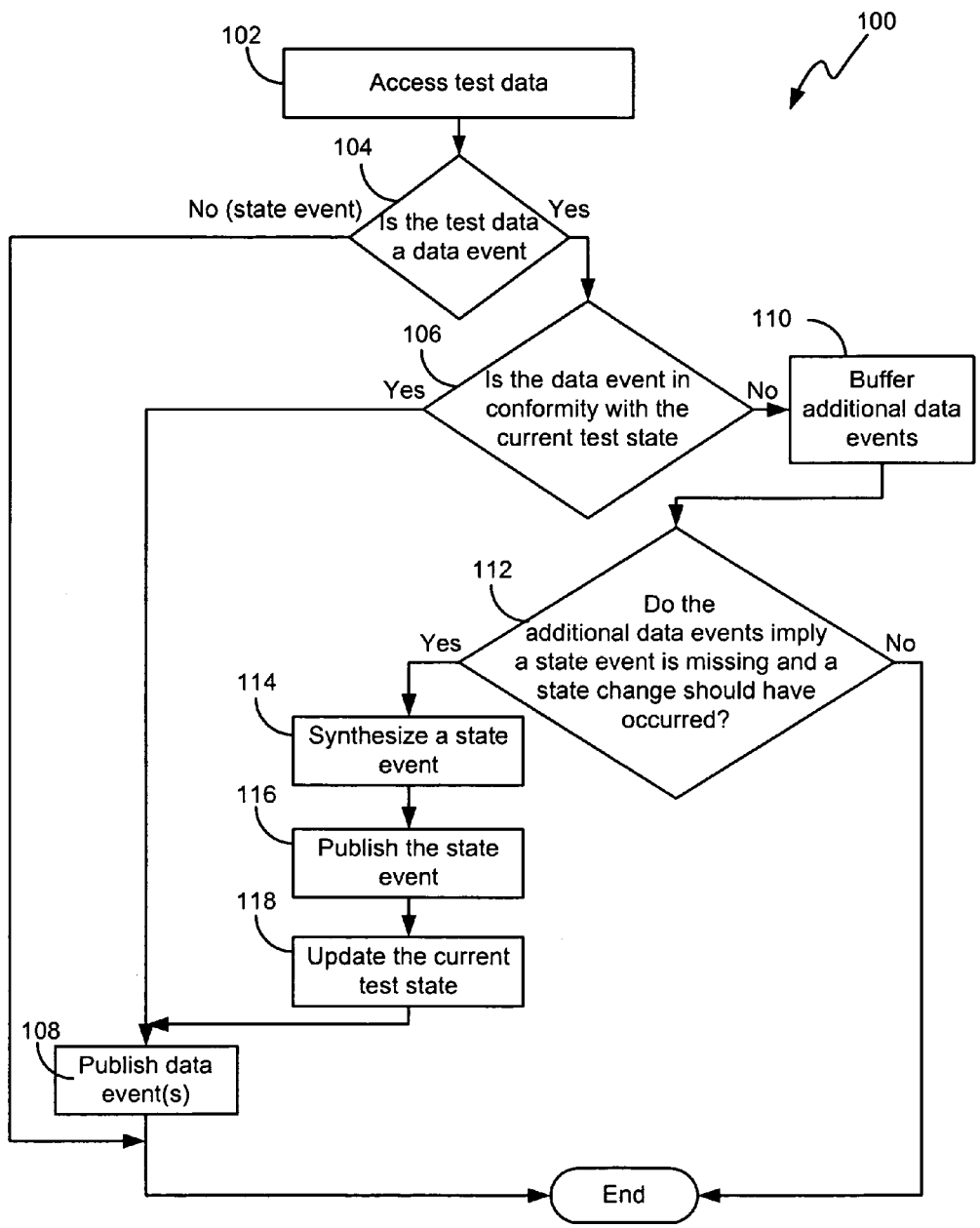
FIG. 1 illustrates a first exemplary flowchart for synthesizing state events for a test data stream.

FIG. 1 illustrates first exemplary flowchart 100 for synthesizing state events for a test data stream. Step 102 accesses the test data. Step 104 determines if the test data is a data event and if so proceeds to step 106, or if the test data is not a data event (e.g., a state event), then flowchart 100 ends. Step 106 determines if the data event is in conformity with the current test state and, if yes, proceeds to step 108 and if not, proceeds to step 110. Upon reaching step 108 from step 106, step 106 publishes the data event that is in conformity with the current test state. After step 108 publishes the data event, flowchart 100 ends.

Step 110 buffers additional data events then step 112 determines if the additional data events imply a state event is missing and a state change should have occurred, if yes, processing proceeds to step 114, if not, flowchart 100 ends.

Step 114 synthesizes a state event. Step 116 publishes the state event. Step 118 updates the current test state, in accord with the implied state event, and step 108 publishes the data event(s) comprising the data event and additional data events buffered in step 110.

Step 110 buffers additional data events. In one embodiment, a fixed number of data events are buffered, the fixed number being a matter of design choice. In another embodiment, all data events, prior to a state event, are buffered. In yet another embodiment, steps 110 and 112 are performed iteratively wherein one additional data event is buffered and evaluated to determine if a conclusion can be made, within a given confidence level, that a state event is or is not missing. If the confidence level is not achieved, a second additional data event is buffered. The loop is repeated until a sufficient confidence level is determined or it is determined that certainty can be achieved. In the later case, the data event may then be deemed to not imply a state event is missing and processing concluding.

In one embodiment, the order of step 116, for publishing the state event precedes step 118 for updating the current test state, as shown. In another embodiment, steps 116 and 118 are reversed.

Flowchart 100 may be repeated, such as until no test data remain unaccessed.

Figure 2:
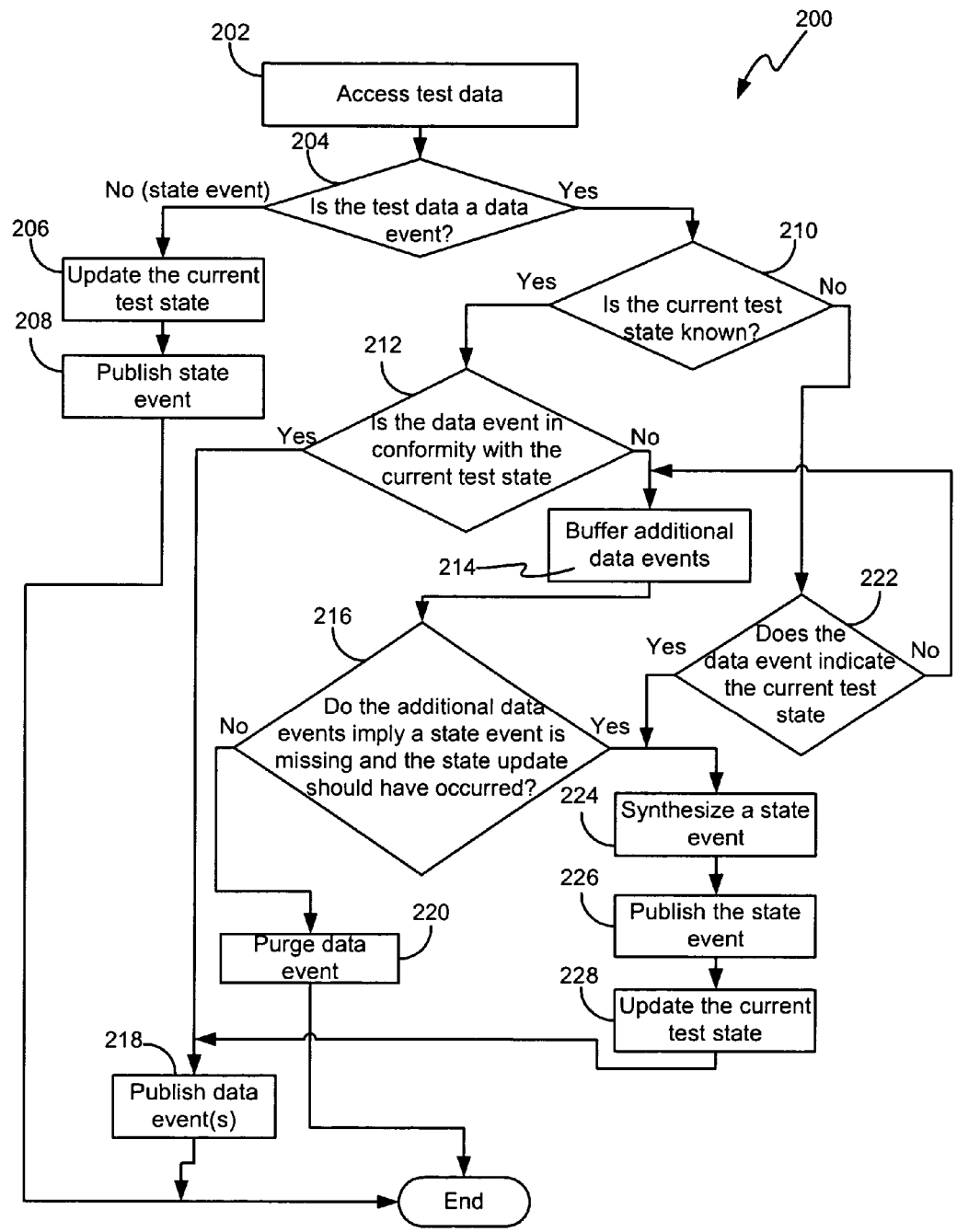
FIG. 2 illustrates a second exemplary flowchart for synthesizing state events for a test data stream.

FIG. 2 illustrates second exemplary flowchart 200 for synthesizing state events for a test data stream. Step 202 accesses test data. Step 204 determines if the test data is a data event and, if yes, step 210 is executed, if no then the test data is a state event and step 206 is executed.

Step 206 updates the current test state and then step 208 publishes the state event. In another embodiment, steps 206 and 208 are reversed.

Step 210 determines if the current test state is known. If the current test state is not known, that is when the data event is received prior to an initial setting of the current test state, step 222 is then executed. If the state is known, step 212 is executed.

If step 210 determines the current test state is not known then step 222 is executed to determine if the data event indicates the current test state and, if yes, executes step 224, and if no, executes step 214.

Returning to step 212 to determine if the data event is in conformity with the current test state and, if yes, step 218 publishes the data event and, if no, step 214 is executed to buffer additional data events. Upon buffering the additional data events, step 216 determines if the additional data events imply a state even is missing and the state update should have occurred.

Step 214 buffers a number of data events. In one embodiment, a fixed number of data events are buffered, the fixed number being a matter of design choice.

In another embodiment, all data events, prior to a state event, are buffered. In another embodiment, all data events, ending with one state event, are buffered. In yet another embodiment, steps 214 and 216 are performed iteratively wherein one additional data event is buffered and evaluated to determine if a conclusion can be made, within a given confidence level, that a state event is or is not missing. If the confidence level is not achieved, a second additional data event is buffered. The loop is repeated until a sufficient confidence level is determined or it is determined that certainty can be achieved. In the later case, the data event may then be deemed to not imply a state event is missing and processing concluding.

If step 216 determines the additional events do not imply a missing state event and no state update should have occurred, then step 220 is executed to purge the data event. In one embodiment, step 220 purges the data event by deleting the data event from the test data. In another embodiment, step 220 omits the step of publishing the data event thus allowing memory and/or storage space previously utilized to store the data event to be made available for other uses.

If step 216 determines the additional events do imply a missing state event and a state update should have occurred, then step 224 synthesizes a state event, step 226 publishes the state event, step 228 updates the current test state in accord with the implied state event, and step 218 publishes the data event. If execution reaches step 218 via buffering step 214, then step 218 publishes the data event and additional data event(s) buffered in step 218, otherwise step 218 publishes the data event that has been determined to be in conformity with (see, step 212), or indicates (see, step 222), the current test state. In one embodiment, step 226 precedes step 228 as illustrated. In another embodiment, steps 226 and 228 are reversed.

In one embodiment, step 216 determines that the additional events imply a missing state event from a state event in the additional events. The state event in the additional events expressly indicating a second state change and implying the missing state event.

Step 218 publishes the data event and steps 208 and 226 publish the state event. In one embodiment, publishing comprises passing the data events or state events to be published to a consumer of the test data. In another embodiment, publishing stores the data events and state events, which may then be accessed by a consumer of the stored data events and state events. In another embodiment, publishing sets an attribute (e.g., flag, index, pointer) to indicate ones of the data events and state events are valid. The attribute may be integrated into the ones of the data events and state events or distinct from the data events and state events. The consumers then access the attribute to determine which data events and state events are to be consumed.

Step 202 accesses the test data. In one embodiment, step 202 may read the test data. In other embodiments, step 202 receives the test data.

Step 216 determines if the additional data events imply a state event and the state update should have occurred. In one embodiment, attributes associated with the additional data events determines if an implied state change occurred. For example, the data within the data events themselves may imply a state change, such as data events that are parametric test events (e.g., measurement values for voltage, amperage, resistance, counters, time delays, et cetera) may indicate one state, whereas data events that are functional test events (e.g., summaries, true/false indicators) may indicate another type of state. In another embodiment, the additional attributes may be more explicit in implying a change of state. For example one data event may include an attribute explicitly identifying a state and a subsequent data event explicitly identifies another state.

Figure 3:
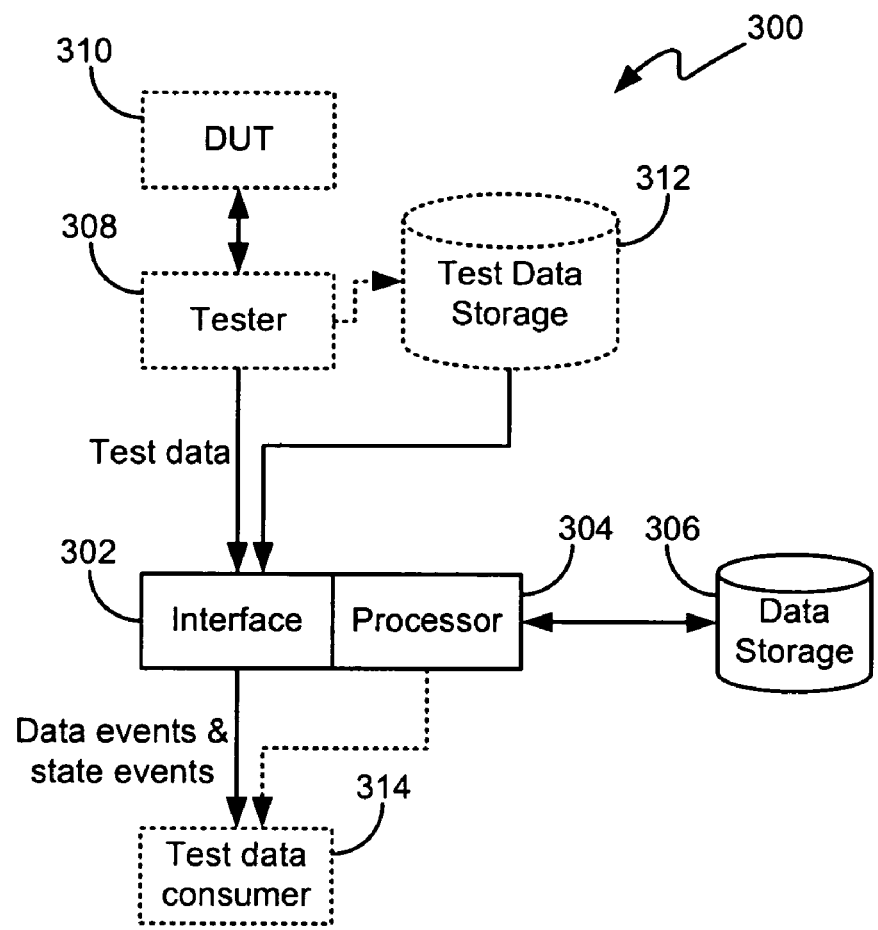
FIG. 3 illustrates a system operable to perform the steps illustrated by FIG. 1 and FIG. 2.

FIG. 3 illustrates system 300 operable to perform the steps illustrated by FIG. 1 and FIG. 2. Interface 302 accesses test data. In one embodiment, the test date is accessed from tester 308 performing tests on DUT 310. In a further embodiment, tester 308 is a plurality of testers. In another further embodiment, DUT 310 is a plurality of DUTs.

In another embodiment, test data is accessed from test data storage 312. Test data storage 312 is populated with test data from, for example, tester 308 performing tests on DUT 310.

Processor 304 is in communication with interface 302 and data storage 306. Processor 304, upon accessing one of the data events, determines if the data event is in conformity with the current test state, see step 106 and step 212, supra. If processor 304 determines that the data event is in conformity with the current test state, publishing the data event. See, step 108 and step 218, supra.

If processor 304 determines that the data event is not in conformity with the current test state then processor 304 causes data storage 306 to buffer a number of additional data events. See, step 110 and step 214, supra. If processor 304 determines the number of additional data events imply that a state event should have been received and a state change should have occurred, prior to accessing the one of the data events (see, steps 112 and step 216, supra), then synthesizing and publishing the state event that should have been received in conformity with the implied state change (see, steps 114, 116 and steps 224, 226, supra). Processor 304 updates the current test state in accord with the state event. See, step 118 and step 228, supra. The data event is then published. See, step 108 and step 228, supra.

In another embodiment, processor 304 executes a state machine program. The state machine determines acceptable transitions from one test state to another test state as determined by values of the current test state. For example, the state machine can cause data storage 306 to buffer test data and determine if the buffered test data includes either 1) valid state events or 2) valid implied state events. Upon determining the state event or implied state event is valid, allowing the updating of the current test state accordingly. If the state event or implied state event is not valid, discarding the data events preceding the next valid state event or implied state event.

For example, if a valid state event updated the current test state to "lot" and a buffered state event, or implied state event, would update the current test state to "device" then the state machine would permit the update. However, if the current test state is "test suite" and the upcoming state event is "wafer" the transition is not valid and the update denied. In a further embodiment, all test data preceding the invalid update is purged. In still a further embodiment, all test data is purged until a valid state event is encountered.

What is claimed is:

1. A method of synthesizing a state event for a test data stream, comprising:
  accessing a stream of test data, the test data comprising 1) a number of state events that update a current test state and 2) a number of data events interspersed with the ones of the state events;
  upon accessing one of the data events, determining if the data event is in conformity with the current test state;
  if the data event is in conformity with the current test state, publishing the data event; and
  if the data event is not in conformity with the current test state,
    buffering a number of additional data events; and
    if the number of additional data events imply that a state event should have been received and a state change should have occurred, prior to accessing the data event,
      A) synthesizing and publishing the state event that should have been received, in conformity with the implied state change;
      B) updating the current test state in accord with the implied state change; and
      C) then, publishing the data event.

2. The method of claim 1, further comprising, if the number of additional data events do not imply that a state event should have been received and a state change should have occurred, then purging the data event.

3. The method of claim 1, further comprising:
  upon accessing one of the state events,
    updating the current test state in accord with the state event; and
    publishing the state event.

4. The method of claim 1, wherein publishing the data event further comprises making the date event available to a consumer of the test data.

5. The method of claim 1, wherein the data event is accessed prior to an initial updating of the current test, the method further comprising:
  determining if the data event indicates a state; and
  if the data event indicates the state,
    synthesizing a state event corresponding to the indicated state;
    updating the current test state in accord with the indicated state; and
    then, publishing the synthesized state event and publishing the data event.

6. The method of claim 1, wherein accessing the test data further comprises receiving the test data.

7. The method of claim 1, wherein determining if the number of additional data events imply a state change, further comprises, determining if the additional data events include attributes, wherein the attributes are consistent with a test state different from the current test state.

8. A system for synthesizing state events for a test data system, comprising:
  an interface, operable to access a stream of test data, the test data comprising 1) a number of state events that update a current test state and 2) a number of data events interspersed with the ones of the state events;
  data storage; and
  a processor, in communication with the interface and the data storage, operable to,
  upon accessing one of the data events, determine if the data event is in conformity with the current test state;
  if the data event is in conformity with the current test state, publish the data event; and if the data event is not in conformity with the current test state,
    A) cause the data storage to buffer a number of additional data events; and
    B) if the number of additional data events imply that a state event should have been received and a state change should have occurred, prior to accessing the data event,
      (I) synthesize and publish the state event that should have been received, in conformity with the implied state change;
      (II) update the current test state in accord with the implied state change; and
      (III) the, publish the data event.

9. The system of claim 8, wherein the processor is further operable to, if the number of additional data events do not imply that a state vent should have been received and a state change should have occurred, purge the data event.

10. The system of claim 8, wherein:
  the processor is further operable to,
    upon accessing one of the state events,
      A) update the current test state in accord with the state event; and
      B) publish the state event.

11. The system of claim 8, wherein the processor is operable to publish data events and state events by making the data events and the state events available to a consumer of the test data.

12. The system of claim 8, wherein the processor is operable to publish data events and state events by causing the interface to output the data events and the state events.

13. The system of claim 8, wherein, the processor, upon accessing the data event, prior to an initial updating of the current test state, is further operable to:
  determine if the data event indicates a state;
  if the data event indicates the state,
    synthesize a state event corresponding to the indicated state; and
    update the current test state in accord with the indicated state; and
  then, publish the synthesized state event and publish the data event.

14. The system of claim 8, wherein the processor is operable to determine if the number of additional data events imply a state change, by further being operable to determine if the additional data events include attributes, wherein the attributes are consistent with a test state different from the current test state.

15. The system of claim 8, further comprising at least one tester to generate test data associated with tests on a number of devices under test, the test data being accessible to the interface.

16. The system of claim 8, further comprising test data storage comprising test data previously generated, the test data being accessible to the interface as the stream of test data.

17. One or more machine-readable mediums having stored thereon sequences of instructions, which, when executed by a machine, cause the machine to perform the actions of:
  accessing a stream of test data, the test data comprising: 1) a number of state events that update a current test state and 2) a number of data events interspersed with the ones of the state events;
  upon accessing one of the data events, determining if the data event is in conformity with the current test state;
  if the data event is in conformity with the current test state, publishing the data event; and
  if the data event is not in conformity with the current test state,
  buffering a number of additional data events; and
  if the number of additional data events imply that a state event should have been received and a state change should have occurred, prior to accessing the data event,
    A) synthesizing and publishing the state event that should have been received, in conformity with the implied state change;
    B) updating the current test state in accord with the implied state change; and
    C) then, publishing the data event.

18. The machine-readable mediums of claim 17, further comprising instructions for, if the number of additional data events do not imply that a state event should have been received and a state change should have occurred, then purging the data event.

19. The machine-readable mediums of claim 17, further comprising instructions for:
  upon accessing one of the state events,
    updating the current test state in accord with the state event; and
    publishing the state event.

20. The machine-readable mediums of claim 17, wherein the instructions for publishing the data event, further comprise instructions for making the data event available to a consumer of the test data.

21. The machine-readable mediums of claim 17, wherein the instructions further comprise instructions for:
  upon the data event being accessed prior to an initial updating of the current test,
  determining if the data event indicates a state; and
  if the data event indicates the state,
    A) synthesizing a state event corresponding to the indicated state;
    B) updated the current test state in accord with the indicated state; and
    C) then, publishing the synthesized state event and publishing the data event.

22. The machine-readable mediums of claim 17, wherein the instructions for determining if the number of additional data events imply a state change, further comprise instructions for, determining if the additional data events include attributes, wherein the attributes are consistent with a test state different from the current test state.

* * * * *

UNITED STATES PATENT AND TRADEMARK OFFICE
CERTIFICATE OF CORRECTION

PATENT NO.        : 7,584,395 B2                                        Page 1 of 1
APPLICATION NO. : 11/399730
DATED             : September 1, 2009
INVENTOR(S)       : Reid F. Hayhow et al.

It is certified that error appears in the above-identified patent and that said Letters Patent is hereby corrected as shown below:

Column 3, line 48, "even" should be --event--.

Column 6, line 55, "vent" should be --event--.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,584,395 B2  Page 1 of 1
APPLICATION NO. : 11/399730
DATED : September 1, 2009
INVENTOR(S) : Hayhow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 605 days.

Signed and Sealed this

Fourteenth Day of September, 2010

David J. Kappos
*Director of the United States Patent and Trademark Office*